United States Patent [19]

Bianchi

[11] Patent Number: 5,257,537

[45] Date of Patent: Nov. 2, 1993

[54] SELF ACTUATING THROTTLE VALVE

[75] Inventor: Timothy D. Bianchi, Tallassee, Ala.

[73] Assignee: Schlumberger Industries, Inc., Atlanta, Ga.

[21] Appl. No.: 966,622

[22] Filed: Oct. 26, 1992

[51] Int. Cl.⁵ .......................... G01F 7/00; G05D 7/01
[52] U.S. Cl. .................................. 73/197; 137/454.2; 137/503; 137/599.1
[58] Field of Search .............. 137/503, 454.2, 515, 137/515.3, 515.5, 515.7, 517, 599.1; 73/197

[56] References Cited

U.S. PATENT DOCUMENTS

| 13,498 | 8/1855 | Russell | 137/503 |
| 922,578 | 5/1909 | Gries | 137/517 |
| 3,088,481 | 5/1963 | Brueckner et al. | 73/197 X |
| 3,850,195 | 11/1974 | Olsson | 137/503 |
| 4,429,571 | 2/1984 | Kullmann et al. | 73/197 |

FOREIGN PATENT DOCUMENTS 2279005 3/1976 France ................ 137/503

Primary Examiner—Stephen M. Hepperle
Attorney, Agent, or Firm—Dale V. Gaudier

[57] ABSTRACT

A self-actuating throttle valve for use with fluid measurement apparatus such as a water meter. The valve includes a cylindrical body disposed within the outlet of the fluid measuring apparatus, fluid bypass openings formed in the body to enable fluid to flow through the body, and a piston disposed within the body. The piston is biased by a spring in a first position whereby the fluid may flow around the piston and body and through the bypass openings when the rate of fluid flow is below a predetermined amount. When the rate of fluid flow is above a predetermined amount, pressure from the fluid causes the piston to move to a second position whereby the piston covers the bypass openings by a predetermined amount to substantially reduce fluid flow. The throttle valve prevents damage to the fluid measurement apparatus when high fluid flow rates are encountered. The valve has particular application in the area of fire service water metering devices which include both a high flow rate measurement device (e.g. a turbine flow meter) and a low flow rate fluid metering device (e.g. a positive displacement water meter) having their inlets and outlets connected in parallel where the low flow rate metering device might be damaged if subject to too high a fluid flow rate.

21 Claims, 4 Drawing Sheets

SELF ACTUATING THROTTLE VALVE

BACKGROUND OF THE INVENTION

1. Field of the Invention

The invention relates to the field of valves for use with water meters or the like, and more particularly to a throttle valve for use with a water meter to prevent excessive flow of water through the meter.

2. Description of the Prior Art

Water meters and flow regulating valves come in a wide variety of sizes and designs.

One type of water metering apparatus is a so-called "compound-type fire service" meter. Fire service meters are designed to be connected in a supply line leading from a water main to the structure to be protected.

Water supply line sizes can range from 4 inches up to 10 inches or greater in diameter. The supply line is used to supply potable water for consumption by the occupants of the structure. The supply line is also frequently connected to a water sprinkler system contained within the structure or to pressurized standpipes or hydrants located in or about the structure for use by a fire department in the event a fire occurs on the premises.

A fire service meter is often used to measure the amount of water being supplied to a business establishment, apartment building, office building or the like. The range of measurement for such devices under normal conditions would be from less than 1 gallon per minute to about 1000 gallons per minute. However, under extraordinary conditions, e.g. when there is a fire and a sprinkler system or other fire fighting apparatus are connected to the water main, flow rates of over 5,000 gallons per minute may be necessary.

Compound-type fire service meters are generally characterized by having two flow measuring elements connected in parallel, with a common inlet and a common outlet disposed in the water supply line. A first measuring element is comprised of a conventional positive displacement water meter, such as the Schlumberger Neptune® T-10 water meter. This type of meter is designed to have high accuracy in measuring relatively low flow rates (e.g. ¾ of a gallon per minute flow up to 55 gallons per minute, depending upon the meter size). The other measuring element is generally a turbine type flowmeter. Turbine flow meters generally have poor accuracy at low flow rates but are capable of good accuracy at much higher flow rates than a positive displacement type water meter. For example, a turbine meter, depending upon its diameter and design, may measure flow rates accurately of 60 gallons per minute up to more than 5,000 gallons per minute.

The positive displacement meter and the turbine meter work together so that the positive displacement meter measures water flow accurately through the supply line at low flow rates and the turbine meter measures water consumption in cases where intermediate to high flow rates occur, e.g. when water is being drawn through the supply line due to large water demand such as might occur when a sprinkler system is activated or where fire fighting apparatus is connected to the supply line to draw water in high volumes.

One such type of conventional fire service meter is the Schlumberger NEPTUNE® PROTECTUS® III. In addition to a positive displacement meter and a turbine meter, this type of fire service meter includes a pressure sensitive check valve, comprised of a spring-loaded diaphragm placed in the main supply line adjacent the turbine meter. This valve is designed to open when a certain flow rate is reached or exceeded. Thus, in low water demand situations, the valve remains closed, causing water in the supply line to bypass the turbine meter and flow only through the positive displacement meter section of the fire service meter. The positive displacement meter measures water flow accurately at low flow rates.

When the flow rate exceeds a certain predetermined amount, the check valve in the main supply line begins to open, allowing water to flow through the main supply line and through the turbine flow meter. When the check valve is fully open, most of the water flows through the main supply line and through the turbine meter with the positive displacement meter still running at or above the flow rate at which the valve started to open.

At this point, the turbine meter is operating well within its normal operating measurement range. However, the positive displacement meter is now running at or above its normal maximum continuous design flow rate. If this condition continues for extended periods, it can cause excessive wear to the positive displacement flow meter resulting in possible damage to the meter.

Another drawback to the foregoing arrangement is that during the transition from the low flow range to the high flow range, i.e. during the period in which the check valve is beginning to open but not yet fully opened, the turbine flow meter is not operating within its most accurate range. The positive displacement meter is operating at or near its maximum continuous design flow rate, while the turbine meter is generally operating at its lowest and least accurate flow range.

It would therefore be desirable to have a compound-type fire service meter in which the transition range from low flow to high flow was made as short as possible. It would also desirable if a compound-type fire service meter of the type described above was designed to ensure rapid opening of the check valve at a predetermined flow rate to thus minimize the transitional flow range. It would be a further desirable feature for a compound-type fire service meter to have some means for protecting the positive displacement meter from being subject to higher than desirable flow rates to prevent wear or damage to the positive displacement meter, if it operates at intermediate to high flow rates for extended periods.

SUMMARY OF THE INVENTION

The foregoing desirable characteristics are provided by the present invention. In particular, the invention concerns a self-actuating throttle valve for use with a fluid measurement apparatus, such as a fire service meter. The throttle valve comprises a body designed to be placed within an outlet of the measuring apparatus and at least one bypass opening provided in the body to enable fluid to flow through the body. A piston is disposed within the body and there is provided means for biasing the piston in a position so that fluid may flow around the piston and body and through the bypass opening when the rate of fluid flow is below a predetermined amount and the piston covers the bypass opening to substantially block fluid flow when the rate of fluid flow is above a predetermined amount.

More particularly, the self-actuating throttle valve may be placed in the outlet of a positive displacement meter connected in parallel with a turbine flow meter (or other such type of meter capable of measuring high fluid flow rates) with common inlets and outlets connected to a water supply line. The throttle valve prevents an excessive amount of water from flowing through the positive displacement meter for extended periods of time which would otherwise cause excessive wear to the positive displacement meter. Furthermore, if a check valve is provided in the main supply line adjacent the turbine meter, the action of the throttle valve in preventing fluid flow through the low flow (positive displacement meter) line promotes a sharp transition in the flow rate through the turbine meter and check valve. This minimizes the transitional range where both the positive displacement and turbine flow meters are simultaneously operating at reduced accuracy.

The self-actuating throttle valve is preferably cylindrical in shape and is disposed directly within the outlet of the low flow metering line. The biasing means of the throttle valve is preferably comprised of a spring having a first portion contacting the throttle valve body and a second portion contacting the piston. The body may also include at least one fluid relief opening for allowing a predetermined flow of fluid through the body even when the piston covers the bypass opening. Alternatively the piston may be arranged to not completely cover the bypass opening allowing for fluid relief at a predetermined flow rate.

In addition to its use with fire service meters, the self-actuating throttle valve of the present invention may be used as a flow limiter in a water line. Such a device is useful to prevent excessive flow rates through a positive displacement meter, compound meter, turbine meter, pipes or other fluid conduit which might otherwise be damaged by high flow rates. Therefore, the self-actuating throttle valve of the present invention has applications outside the field of use with fire service meters.

BRIEF DESCRIPTION OF THE DRAWING FIGURES

These and other features and advantages of the present invention are described in more detail in the following detailed description of the preferred embodiment, when taken in conjunction with the accompanying drawing figures wherein.

DETAILED DESCRIPTION OF THE PREFERRED EMBODIMENT

Figure 1:
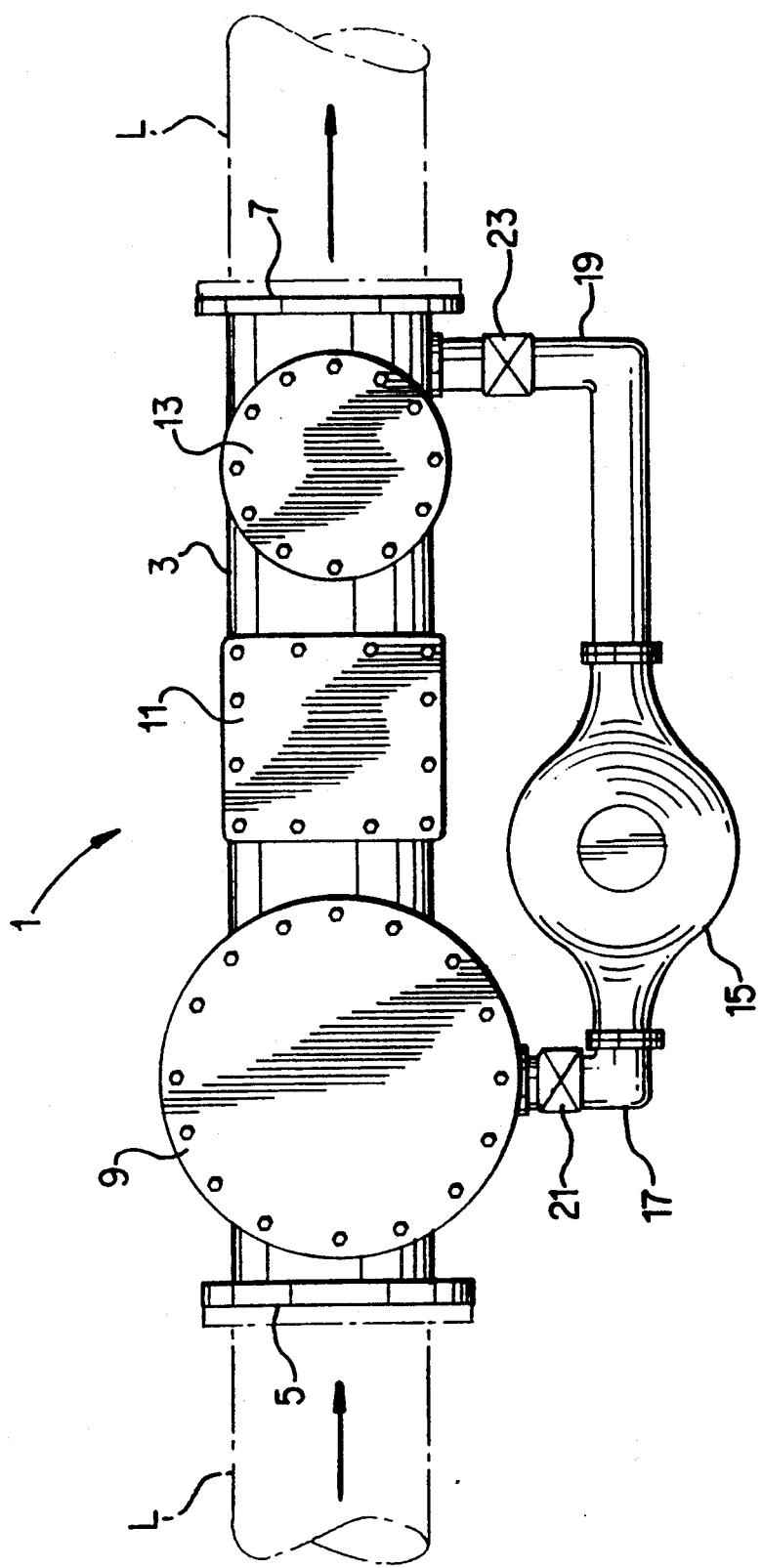
FIG. 1 is a top plan view of a fire service metering apparatus constructed in accordance with principles of the present invention.
Figure 2:
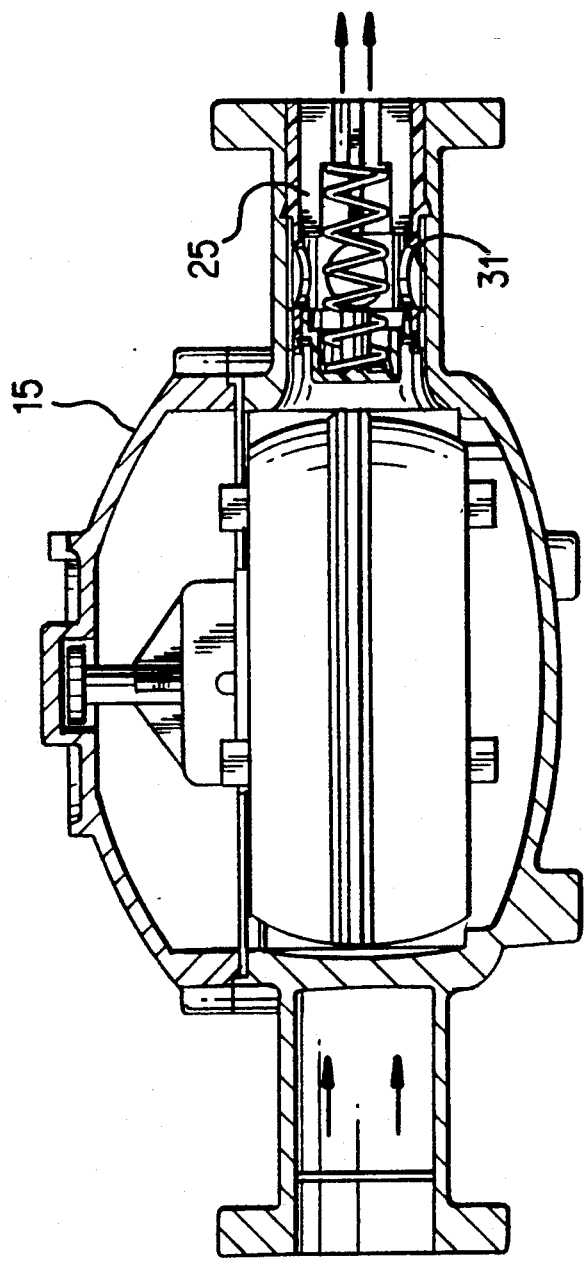
FIG. 2 is a cross-sectional view of a positive displacement type flow meter as used in conjunction with the fire service metering apparatus of FIG. 1, the flow meter including a self-actuating throttle valve designed in accordance with the principles of the present invention.
Figure 5:
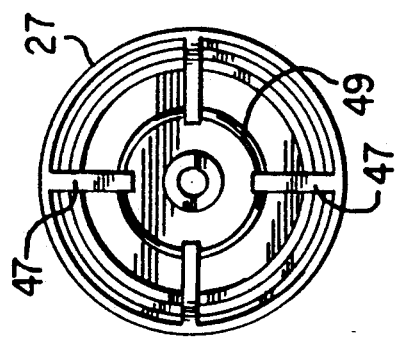
FIGS. 4 and 5 are left and right side plan views, respectively, of the throttle valve shown in FIG. 2.

FIG. 1 shows a combination liquid metering apparatus 1 which is particularly adapted for use as a fire service meter. Fluid metering apparatus 1 consists of a main body 3 having an inlet 5 and an outlet 7 disposed in-line with a water supply line L (shown in dashed outline).

The diameter of main body 3 is normally the same diameter as water supply line L. This diameter can range from approximately 4 inches to 10 inches or greater.

Within main body 3 there is disposed a strainer element within area 9, a turbine flow meter disposed within area 11, and a check valve disposed within area 13.

Disposed in parallel with main body 3 is a positive displacement-type fluid meter 15. Fluid metering device 15 has an inlet 17 connected to the strainer area 9 and an outlet 19 connected downstream from check valve area 13. Inlet 17 and outlet 19 may also include cut-off valves 21 and 23, respectively, for adjusting the amount of flow through fluid metering device 15.

The arrangement described so far is conventional and is exemplified by the Schlumberger NEPTUNE® PROTECTUS® III fire service meter.

A fire service meter, such as described above, is placed in the water supply line leading to a structure to be protected. Frequently, this same supply line is also used to supply potable water to occupants of the structure. In normal use, potable water consumption would be in the range of less than 1 gallon per minute up to 50 gallons per minute. The check valve disposed within area 13 of the main body 3 consists of a spring-loaded diaphragm which essentially blocks fluid flow through main body 3 below a certain predetermined flow rate (e.g. 50–60 gallons per minute). Under these normal conditions, fluid enters the main body 3 through inlet 5 and passes through the strainer disposed within strainer area 9 and into the bypass line comprised of inlet 17, fluid metering device 15, outlet 19 and thence to the outlet 7 of main body 3.

The positive displacement-type fluid meter which is preferably used for fluid metering device 15 is generally characterized by having good flow measurement accuracy at low to medium flow rates (e.g. ¾ gallon per minute up to around 50 gallons per minute).

Positive displacement meter 15 can be, for example, of the type manufactured by Schlumberger and known as the NEPTUNE® TRIDENT® T-10. The design and construction of such a positive displacement meter is well-known in the art and will not be described further here. Such meters generally come in sizes from ⅝ inch to 1½ inches or 2 inches, where the size indicates the diameter of piping the meter is designed to mate with.

In the event that flow through water supply line L and main body 3 exceed a predetermined rate, the check valve disposed within main body 3 will begin to open to allow water to flow directly through main body 3. This water flow will be measured by the turbine flow meter disposed within area 11 of main body 3. Turbine flow meters are characterized by having good accuracy from flow rates of approximately 50–60 gallons up to over 5,000 per minute. However, their accuracy is relatively poor at the low flow rates characterized by normal consumption of water. Such a meter is exemplified by the Schlumberger NEPTUNE® HP ™ turbine flow meter.

Once the flow rate through main body 3 is sufficient to completely open the check valve, virtually all the water from supply line L will go through main body 3 and the turbine-type flow metering device, with little going through the low flow metering device 15. High flow rates are generally encountered only during extraordinary circumstances, such as if fire sprinklers are activated or fire fighting apparatus is connected to a hydrant or a pressurized standpipe to fight a fire in the structure.

Thus, a conventional fire service meter comprises a first fluid metering device (e.g. a turbine flow meter) which is designed to have good accuracy at extremely high flow rates and a second metering device (e.g. a positive displacement flow meter) connected parallel to the first fluid metering device to measure fluid flow accurately at lower flow rates. A check valve disposed downstream of the first fluid metering device is used to determine which of the two fluid metering devices will be activated, depending upon the detected fluid flow rate.

One problem which has been encountered with such fire service meters is that there is a transitional fluid flow range which occurs between the time that the check valve first begins to open until the time it is completely opened. In this transitional fluid flow range, it is possible for fluid flowing through the bypass where the positive displacement fluid metering device 15 is disposed to exceed the design parameters of this metering device. Such positive displacement metering devices have lesser accuracy at such excessive flow rates. In addition, excessive flow rates may damage the metering mechanism if they occur over extended periods of time.

The present invention is designed to provide for a sharp transitional cross-over from the low fluid flow metering device to the high fluid flow rate metering device and to protect the low fluid flow metering device from damage from excessive flow rates.

More particularly, the invention concerns a self-actuating throttle valve 25 as shown in FIGS. 2-6. Self-actuating throttle valve 25 is comprised of a cylindrical body 27. Cylindrical body 27 has a portion 29 having a diameter designed to snugly fit within the cylindrical bore 31 of the outlet of meter 15. A second portion 33 of cylindrical body 27 has a diameter slightly less than that of portion 29. A plurality of friction-fitting ears 35 are arranged about the periphery of portion 29 of body 27 to secure throttle valve 25 at a predetermined location within the outlet of metering device 15. Cylindrical body 27 further includes water bypass openings 37 and one or more fluid relief openings 39.

Disposed within cylindrical body 27 is a moveable piston 41. A portion of cylindrical body 27 includes an annular groove 42 for receiving an annular retaining ring 43 which cooperates with a lip 45 formed about one end of piston 41 to prevent piston 41 from moving out of its cooperating relationship with cylindrical body 27.

Cylindrical body 27 further includes a series of internal vanes or supports 47 which support one end of a spring 49. The other end of spring 49 engages piston 41. Spring 49 acts to bias piston 41 in its normally opened position with lip 45 of the piston engaging retaining ring 43 of the cylindrical body.

In operation, throttle valve 25 is placed within the outlet of metering device 15 with piston 41 facing upstream. At or below a predetermined flow rate, fluid flowing through meter 15 flows past and around piston 41 and between portion 33 of cylindrical body 27 and the inner bore 31 of the outlet of meter 15. The fluid flows through bypass openings 37 through the interior of the throttle valve body. The fluid then flows out through the downstream portion 51 of the throttle valve body and exits the metering device 15.

Figure 3:
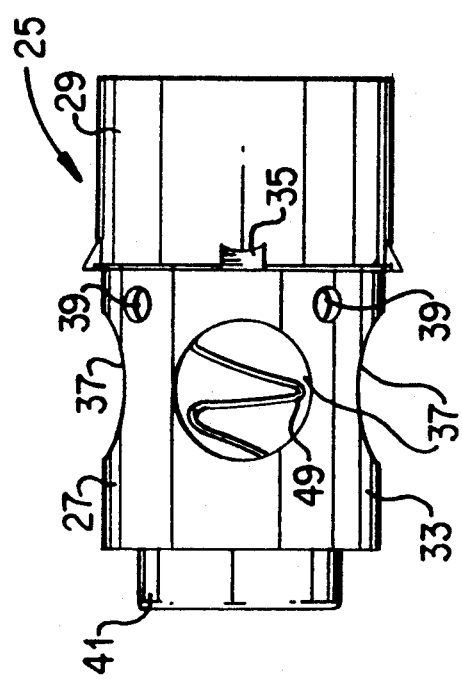
FIG. 3 is a side plan view of a self-actuating throttle valve constructed in accordance with the principles of the present invention.
Figure 4:
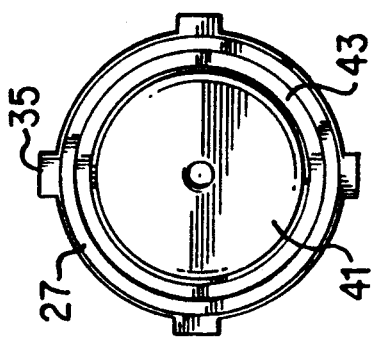
Figure 6:
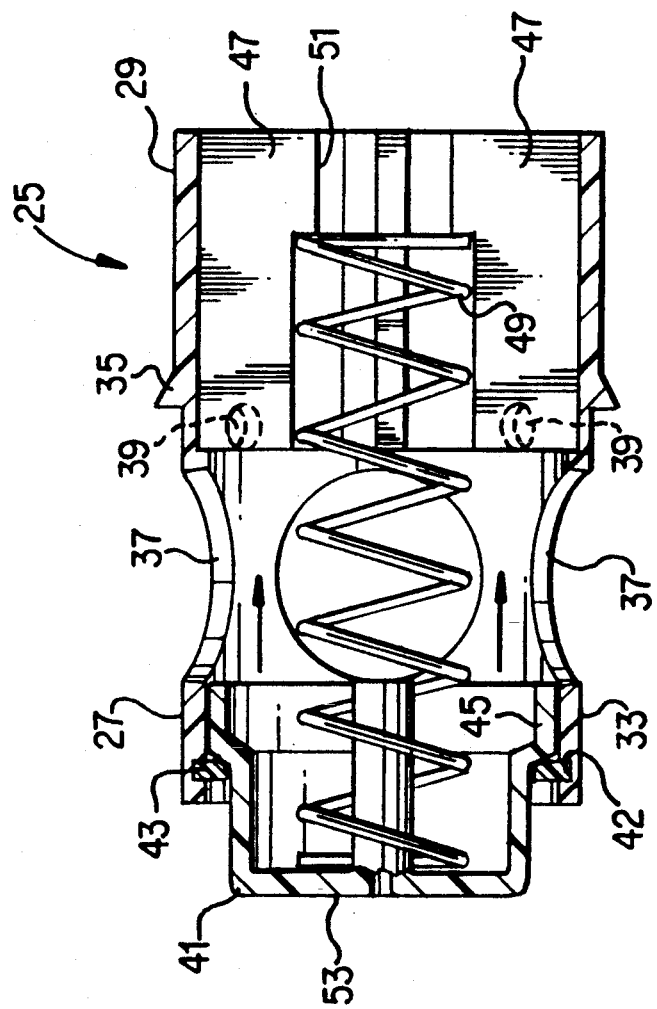
FIG. 6 is a more detailed cross-sectional view of the throttle valve shown in FIG. 3.

The spring constant of spring 49 is chosen to allow movement of piston 41 from its normal rest position (as shown in FIGS. 3 and 6) to a position where piston 41 covers bypass openings 37 when fluid flow rates above a predetermined amount are encountered. The frontal pressure upon the face 53 of piston 41, combined with the venturi effect of fluid flowing through bypass openings 37 behind piston 41 will cause piston 41 to rapidly move to the right (with reference to the drawing figures) against the force supplied by the biasing spring 49. By choosing an appropriate spring constant for spring 49, this movement of piston 41 may be made to occur over a very narrow (1-3 gallon) flow range.

When piston 41 is in its fully actuated position, it covers bypass openings 37, thus preventing substantially most fluid flow from occurring through throttle valve 25. Fluid relief openings 39 serve to allow a small amount of fluid flow even when throttle valve 25 is fully closed. This is to prevent binding of the metering mechanism and the throttle valve under high hydrostatic pressure and to ensure a quick transition of piston 41 to the fully opened position once the fluid flow rate drops below the predetermined flow rate. Alternatively, the spring constant of biasing spring 49 or the length of piston 41 may be chosen so that bypass openings 37 are not fully covered when piston 41 is in its fully actuated position to provide a desired amount of pressure relief.

The foregoing throttle valve is thus characterized by having a short transition from fully opened to fully closed. This sharp transition acts to both protect the associated fluid metering device 15 from excessive flow rates and also promotes quicker opening of the check valve in main body 3 of the fire service meter through the application of back pressure caused by the rapid closing of throttle valve 25.

The throttle valve 25 may be constructed of readily available and inexpensive materials, such as polyvinylchloride (PVC), plastic or the like. Throttle valve 25 may be readily retrofitted to existing fire service meters by temporarily removing positive displacement meter 15, inserting throttle valve 25 into the outlet of the positive displacement meter (or anywhere in the outlet portion 19 of the low flow bypass) and then reassembling the positive displacement meter to the main body 3 of the combination fluid metering apparatus 1.

Throttle valve 25 may further be used as a flow limiter in connection with a flow meter or fluid piping or fluid conduit. When used as a flow limiter, throttle valve 25 acts to prevent flow rates above a predetermined amount to prevent damage to the associated metering device or piping or fluid conduit it is disposed within or connected to.

While the present invention has been described in considerable detail, it will be apparent that various changes and modifications may be made without departing from the sphere and scope of the invention, as set forth in the appended claims.

What is claimed is:

1. A self-actuating throttle valve for use in a fluid conduit, comprising:
   a body designed to be placed within the fluid conduit;
   at least one bypass opening provided in the body to enable fluid to flow through the body;
   a piston disposed within the body;

a downstream portion of the body having a diameter designed to fit snugly within a cylindrical bore forming part of the fluid conduit, and an upstream portion of the body having a diameter less than that of the cylindrical bore of the fluid conduit, the upstream portion having the bypass opening formed therein and the piston disposed therein; and means for biasing the piston in a position whereby fluid may flow around the piston and body and through the bypass opening when the rate of fluid flow is below a predetermined amount, and whereby the piston covers the bypass opening by a predetermined amount to substantially reduce fluid flow when the rate of fluid flow is above a predetermined amount.

2. The valve of claim 1 wherein the biasing means comprises a spring having a first portion contacting the body and a second portion contacting the piston.

3. The valve of claim 1 wherein the body includes at least one fluid relief opening for allowing a predetermined flow of fluid through the body even when the piston covers the bypass opening.

4. The valve of claim 1 wherein the body is cylindrical in shape and is disposed directly within a cylindrical fluid conduit.

5. The valve of claim 1 wherein the downstream portion of the body has a plurality of vanes formed along an interior portion thereof for supporting one end of the biasing means.

6. The valve of claim 5 wherein the biasing means comprises a spring having one end disposed against the vanes and another end biased against the piston.

7. The valve of claim 1 wherein the downstream portion of the body includes at least one fluid relief opening for allowing a predetermined flow of fluid through the body even when the piston covers the bypass opening.

8. A self-actuating throttle valved for use with a fluid measurement apparatus, comprising:

a cylindrical shaped body disposed directly within an outlet of the measurement apparatus;

at least one bypass opening provided in the body to enable fluid to flow through the body;

a piston disposed within the body; and means for biasing the piston in a position whereby fluid may flow around the piston and body and through the bypass opening when the rate of fluid flow is below a predetermined amount, and whereby the piston covers the bypass opening by a predetermined amount to substantially reduce fluid flow when the rate of fluid flow is above a predetermined amount.

9. The valve of claim 8 wherein the biasing means comprises a spring having a first portion contacting the body and a second portion contacting the piston.

10. The valve of claim 8 where in the body includes at least one fluid relief opening for allowing a predetermined flow of fluid through the body even when the piston covers the bypass opening.

11. The valve of claim 8 wherein a downstream portion of the body has a diameter designed to fit snugly within a cylindrical bore forming the outlet of the fluid measurement apparatus, and an upstream portion of the body has a diameter less than that of the cylindrical bore of the outlet, the upstream portion having the bypass opening formed therein and the piston disposed therein.

12. The valve of claim 11 wherein the downstream portion of the body has a plurality of vanes formed along an interior portion thereof for supporting one end of the biasing means.

13. The valve of claim 12 wherein the biasing means comprises a spring having one end disposed against the vanes and another end biased against the piston.

14. The valve of claim 11 wherein the downstream portion of the body includes at least one fluid relief opening for allowing a predetermined flow of fluid through the body even when the piston covers the bypass opening.

15. In a combination liquid metering apparatus of the type including a first fluid metering device for measuring fluid flow rates above a predetermined value, and a second fluid metering device for measuring fluid flow rates below a predetermined value, the first and second fluid metering devices being joined in parallel at their respective fluid inlets and outlets, the improvement comprising:

a self-actuating throttle valve disposed in the outlet of the second fluid metering device to prevent damage to the second fluid metering device when high fluid flow rates are present at the common inlets of the first and second fluid metering devices, said valve including:

a cylindrical shaped body disposed directly within an outlet of the second fluid metering device;

at least one bypass opening provided in the body to enable fluid to flow through the body;

a piston within the body; and means for biasing the piston in a position whereby fluid may flow around the piston and body and through the bypass opening when the rate of fluid flow is below a predetermined amount, and whereby the piston covers the bypass opening by a predetermined amount to substantially reduce fluid flow when the rate of fluid flow is above a predetermined amount.

16. The valve of claim 15 wherein the biasing means comprises a spring having a first portion contacting the body and a second portion contacting the piston.

17. The valve of claim 15 where in the body includes at least one fluid relief opening for allowing a predetermined flow of fluid through the body even when the piston covers the bypass opening.

18. The valve of claim 15 wherein a downstream portion of the body has a diameter designed to fit snugly within a cylindrical bore forming the outlet of the second fluid metering device, and an upstream portion of the body has a diameter less than that of the cylindrical bore of the outlet, the upstream portion having the bypass opening formed therein and the piston disposed therein.

19. The valve of claim 18 wherein the downstream portion of the body has a plurality of vanes formed along an interior portion thereof for supporting one end of the biasing means.

20. The valve of claim 19 wherein the biasing means comprises a spring having one end disposed against the vanes and another end biased against the piston.

21. The valve of claim 18 wherein the downstream portion of the body includes at least one fluid relief opening for allowing a predetermined flow of fluid through the body even when the piston covers the bypass opening.

* * * * *